US012744967B1

(12) United States Patent
Maskatia et al.

(10) Patent No.: US 12,744,967 B1
(45) Date of Patent: Sep. 22, 2026

(54) SYSTEMS AND METHODS FOR DELIVERING MEDIA ASSETS OVER HYBRID DELIVERY PATHS

(71) Applicant: Edge Networks, Inc., Sun Valley, ID (US)

(72) Inventors: Imran Arif Maskatia, Palo Alto, CA (US); Nicholas James Hottinger, Boise, ID (US)

( * ) Notice: Subject to any disclaimer, the term of this patent is extended or adjusted under 35 U.S.C. 154(b) by 302 days.

(21) Appl. No.: 17/741,643

(22) Filed: May 11, 2022

(51) Int. Cl.
*H04N 21/462* (2011.01)
*H04N 21/426* (2011.01)
*H04N 21/43* (2011.01)
*H04N 21/44* (2011.01)

(52) U.S. Cl.
CPC ..... *H04N 21/4622* (2013.01); *H04N 21/4263* (2013.01); *H04N 21/43072* (2020.08); *H04N 21/44004* (2013.01); *H04N 21/44016* (2013.01)

(58) Field of Classification Search
CPC ......... H04N 21/4622; H04N 21/43072; H04N 21/4263; H04N 21/44004; H04N 21/44016
USPC .......................................................... 725/116
See application file for complete search history.

(56) References Cited

U.S. PATENT DOCUMENTS 6,816,909 B1 * 11/2004 Chang ................ H04L 65/4015 709/227
10,178,431 B2 * 1/2019 Thornburgh ..... H04N 21/44016
11,412,278 B1 * 8/2022 Robinson ................ H04L 67/52
2007/0136777 A1 * 6/2007 Hasek .................... H04N 21/84 348/E7.071
2013/0346631 A1 * 12/2013 Gandhi ............. H04N 21/4622 709/248
2014/0114919 A1 * 4/2014 Woods .............. H04N 21/4821 707/634
2015/0245112 A1 * 8/2015 Whiteing ............ H04N 21/233 725/93
2016/0323482 A1 * 11/2016 Chung ................ H04N 9/8211
2018/0131975 A1 * 5/2018 Badawiyeh ........ H04N 21/2385
2019/0141089 A1 * 5/2019 Loheide .................. H04L 65/65
2020/0068234 A1 * 2/2020 Francisco ........... H04N 21/472

FOREIGN PATENT DOCUMENTS

WO WO-2021101934 A1 * 5/2021

* cited by examiner

*Primary Examiner* — Chenea Davis
(74) *Attorney, Agent, or Firm* — Krishna Kalidindi

(57) ABSTRACT

A method of communicating a media asset includes: transmitting, by a central content controller (CCC) a primary media asset to a regional controller (RC) associated with respective market area (MA) for broadcasting over the air (OTA) to a plurality of viewers located within the MA, wherein the primary media asset includes at least one of an audio component, a video component and a text component, transmitting, by the CCC, a secondary media asset corresponding to the first media asset to a content delivery network (CDN) for access by a viewer device corresponding to least one of the viewers within the MA, wherein the secondary media asset includes at least one of an audio component, a video component and a text component, receiving, by a viewer device, the primary and secondary media assets, synchronizing, by the viewer device, the received media assets; and presenting at least one component of the primary media asset and at least one component of the secondary media asset to a viewer associated with the viewer device.

14 Claims, 7 Drawing Sheets

SYSTEMS AND METHODS FOR DELIVERING MEDIA ASSETS OVER HYBRID DELIVERY PATHS

CROSS-RELATED APPLICATIONS

The present disclosure is related to each of the pending U.S. patent application Ser. No. 16/591,767 filed on Oct. 3, 2019; Ser. No. 17/377,373 filed on Jul. 15, 2021; Ser. No. 17/508,215 filed on Oct. 22, 2021; Ser. No. 17/508,221 filed on Oct. 22, 2021; Ser. No. 17/520,782 filed on Nov. 8, 2021 and Ser. No. 17/700,672 filed on Mar. 22, 2022. The subject matter of each of these pending applications is incorporated in its entirety herein by reference.

BACKGROUND

This disclosure is directed systems and methods for receiving and processing data signals. The data signals can include audio visual (AV) signals such as television (TV) signals for example.

A recently adopted television standard, ATSC 3.0 (Advanced Television Systems Committee) provides for the broadcast (over the air, OTA) of television signals an internet protocol (IP) format—the format in which data is communicated over a broadband and/or internet connection.

OTA interface is a traditional communication path for broadcasting to all receivers within a physical viewing or receiving range. Transmission over a broadband (or network), on the other hand, can take place via unicast (one destination) or multicast (multiple destinations).

In some systems, AV content may be encoded at a central location and communicated to local or regional areas for broadcast transmission over the air (OTA).

Example embodiments of the present disclosure provides an efficient, effective and reliable method for receiving and processing data signals including enhanced data.

The terms "user", "viewer", "customer" and "consumer" are used interchangeably within this disclosure. A "viewer" and "viewer premises" are also used interchangeably. The terms "AV signals", "AV content", "AV program", "data files", "data" and "broadcast content" are also used interchangeably. The terms "communicated", "transmitted", "submitted" and "sent" are all used interchangeably to indicate the sending of data. The terms "existing" and "active" are also used interchangeably in referring to an alert. The terms "data channels", "data subchannels", "data streams", "data sub streams" and "subchannels" are also used interchangeably.

SUMMARY

According to an example embodiment, a method of communicating a media asset is disclosed. The method comprises: transmitting, by a central content controller (CCC) a primary media asset to a regional controller (RC) associated with respective market area (MA) for broadcasting over the air (OTA) to a plurality of viewers located within the MA, wherein the primary media asset includes at least one of an audio component, a video component and a text component; transmitting, by the CCC, a secondary media asset corresponding to the first media asset to a content delivery network (CDN) for access by a viewer device corresponding to least one of the viewers within the MA, wherein the secondary media asset includes at least one of an audio component, a video component and a text component; receiving, by a viewer device, the primary and secondary media assets; synchronizing, by the viewer device, the received media assets; and presenting at least one component of the primary media asset and at least one component of the secondary media asset to a viewer associated with the viewer device.

According to another example embodiment, a computing device is disclosed. The device comprises: a processor, a memory, a communication interface and a system bus for interconnecting the processor, memory and communication interface where the communication interface is configured to: receive media assets from a central content controller (CCC) over a plurality of paths; and communicate data to the CCC, and the processor is configured to: synchronize a media asset received via a first path with a corresponding media asset received via a second path; and present the synchronized media assets.

According to a further example embodiment, a computer readable medium containing program instructions for communicating a media asset is disclosed. The instructions, when executed by one or more processors of one or more computer systems causes the one or more processors to carry out the steps of: transmit, by a central content controller (CCC) a primary media asset to a regional controller (RC) associated with respective market area (MA) for broadcasting over the air (OTA) to a plurality of viewers located within the MA, wherein the primary media asset includes at least one of an audio component, a video component and a text component; transmit, by the CCC, a secondary media asset corresponding to the first media asset to a content delivery network (CDN) for access by a viewer device corresponding to least one of the viewers within the MA, wherein the secondary media asset includes at least one of an audio component, a video component and a text component; receive, by a viewer device, the primary and secondary media assets; synchronize, by the viewer device, the received media assets; and present at least one component of the primary media asset and at least one component of the secondary media asset to a viewer associated with the viewer device.

BRIEF DESCRIPTION OF THE DRAWINGS

The several features, objects, and advantages of example embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the example embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

According to example embodiments, methods and systems are disclosed for utilizing separate delivery paths for communicating data signals to viewers in an ATSC 3.0 environment.

Figure 1:
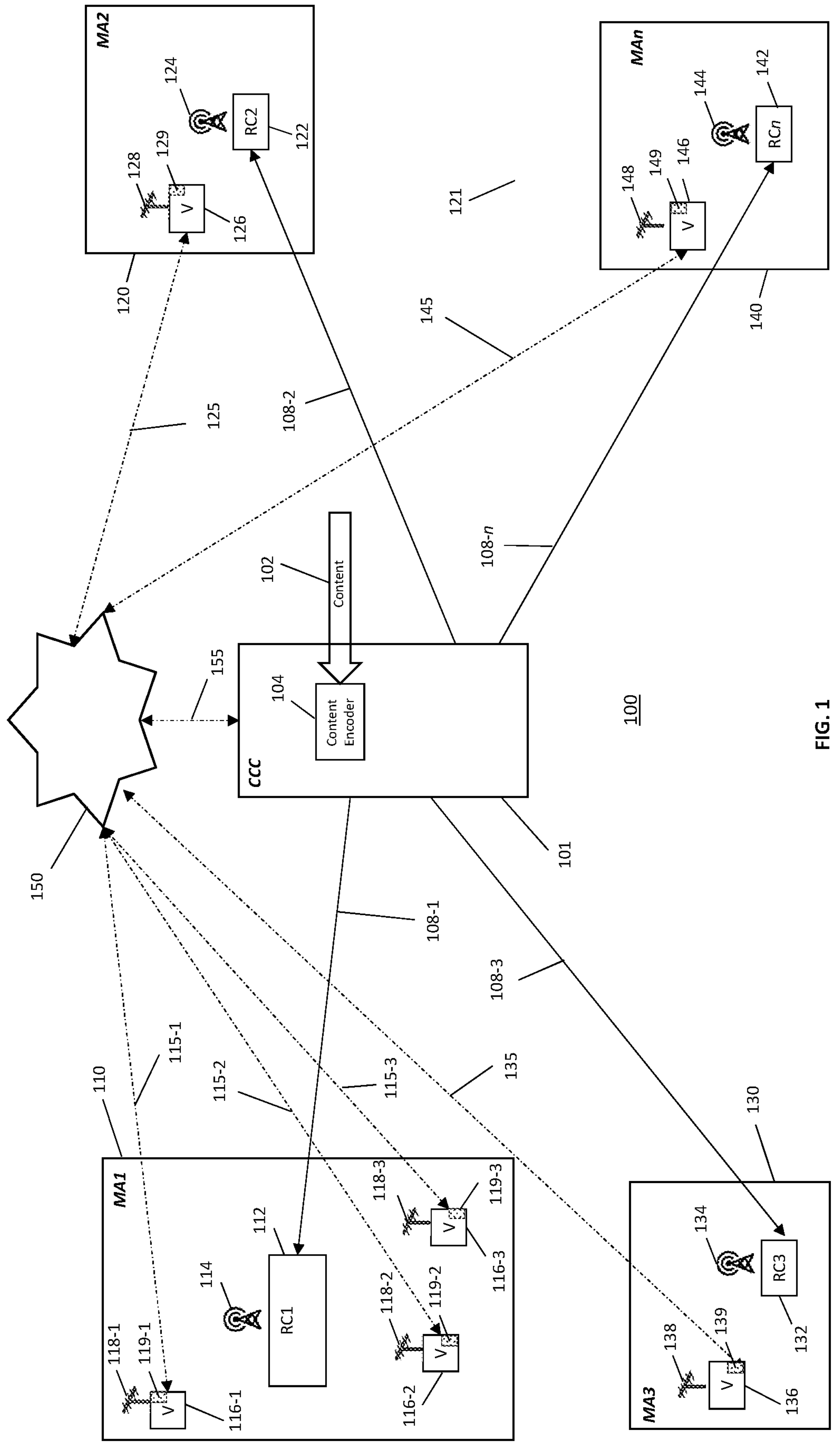
FIG. 1 illustrates a system according to example embodiments.

A system in accordance with example embodiments may be described with reference to FIG. 1. System 100 may comprise a central content controller (CCC) 101. Viewers may be located in a plurality of market areas (MAs). A market area can be a broadcast coverage area or a geographic area. The physical size of a market area can vary from a few square miles to as much as over one hundred square miles. A MA can be a contiguous geographic area for example. In system 100 of FIG. 1, four such market areas 110, 120, 130 and 140 are illustrated. While four MAs are illustrated, this number is an example and the actual number of MAs can be higher or lower.

Each market area may have a regional controller (RC) associated therewith. RC1 (112) can be associated with MA1 (110), RC2 (122) can be associated with MA2 (120), RC3 (132) can be associated with MA3 (130) and RCn (142) can be associated with MAn (140).

Data or content (such as audio visual (AV) data/content for example) 102 from a plurality of sources may be received at CCC 101. The data or content can also be referred to as a media asset. The source of the data may be, but is not limited to, a national television network for example. The data may be received by CCC 101 over dedicated terrestrial or satellite networks or over the Internet 150. The received data may be encoded by encoder 104 of CCC 101.

Content encoder 104 may encode the received data 102 into an IP delivery form using a particular codec such as MPEG-2 or H.265 for example. The encoded data can be packetized and encrypted. In can also be packaged using MPEG Dash or HLS or MP4 for example.

The encoded data may be communicated as one or more streams (data streams or AV streams for example) by CCC 101 to one or more of a plurality of regional controllers (RCs) 112, 122, 132 and 142 (associated with market areas 110, 120, 130 and 140) over a corresponding communication medium or link 108-1, 108-2, 108-3 and 108-4. The communication medium can be a physical private network such as, satellite, microwave, terrestrial or fiber for example. The communication medium can also be a virtual private network (VPN) created over a public network such as the internet for example.

The medium (108-1, 108-2, 108-3, 108-4) over which the data streams are sent (or communicated) utilizing the internet protocol (IP) may be structured similar to a broadcast channel. In an example implementation, a broadcast channel may represent a 6 MHz slice of the radio frequency (RF) spectrum. The 6 MHz frequency bandwidth is specific for broadcasting in the US and in North America—it may be different in other jurisdictions.

The data streams may be sent using Studio-to-Transmitter Link Tunneling Protocol (STLTP). The data streams may be multiplexed by a multiplexer (not illustrated) and exit CCC 101 via a broadcast gateway (not illustrated) and received by a RC. An exciter (not illustrated) at the RC may modulate the data streams onto an RF frequency and send the modulated data streams to the broadcast antenna for broadcasting to the market area in a known manner.

A RC can have an antenna associated therewith for broadcasting the data streams (as data or AV signals for example) over-the-air (OTA) to viewers in the corresponding market area (MA). That is, RC1 (112) can be associated with antenna 114, RC2 (122) can be associated with antenna 124, RC3 (132) can be associated with antennal 134 and RCn (142) can be associated with antenna 144.

The AV signals broadcast by the antenna can be received by viewers within reception range of the AV signals. In MA1 (110) for example, RC1 (112) broadcasts AV signals via broadcast antenna 114. Viewers 116-1, 116-2 and 116-3 within MA1 (110) can receive the AV signals broadcast by antenna 114.

A viewer 116-1 may receive the AV signals via an antenna 118-1 associated with the viewer premises for example. That is, antenna 118-1 can be associated with viewer 116-1, antenna 118-2 can be associated with viewer 116-2 and antenna 118-3 can be associated with viewer 116-3.

The received AV signals can be decoded and processed for presentation to a viewer by a user communication device such as a set-top-box (STB) 119-1 for example. A viewer and associated STB can be associated with a viewer premises such as a home or an office, etc. That is, STB 119-1 can be associated with viewer 116-1 and antenna 118-1, STB 119-2 can be associated with viewer 116-2 and antenna 118-2 and STB 119-3 can be associated with viewer 116-3 and antenna 118-3.

In MA2 (120), RC2 (122) can broadcast AV signals via broadcast antenna 124 for reception by viewer 126 via antenna 128 and processing by STB 129. A similar arrangement is illustrated for the remaining market areas such as MA3 and MAn.

For illustrative purposes, three viewers 116-1, 116-2 and 116-3 are shown as being located in MA1 (110) and within a reception range of the AV signals from broadcast antenna 114 of RC1 (112). One viewer (126, 136 and 146) is illustrated as being located in each of MA2 (120), MA3 (130) and MAn (140). However, the number of viewers within a MA is typically much higher. In some scenarios, a viewer can receive broadcast AV signals from RCs corresponding to multiple MAs due the viewer being located in a physical area where broadcast AV signals from adjacent MAs can overlap.

A viewer (116-1, 116-2, 116-3, 126, 136 and 146) within system 100 utilizing an associated STB can also be connected via a broadband/network connection (115-1, 115-2, 115-3, 125, 135 and 145) to CCC 101 over the Internet or the cloud 150. CCC 101 may be connected to the Internet 150 via a communication link 155.

The network connection(s) 115-1, 115-2, 115-3, 125, 135 and 145 may provide a medium over which input from a viewer can be communicated via an associated STB to CCC 101. The network connection can also be utilized to provide technical information from a STB to the CCC. The technical information can include received broadcast data quality for example. A STB can also request data via a content delivery network (CDN). The network connection can also communicate data from CCC to one or more CDNs.

Figure 2:
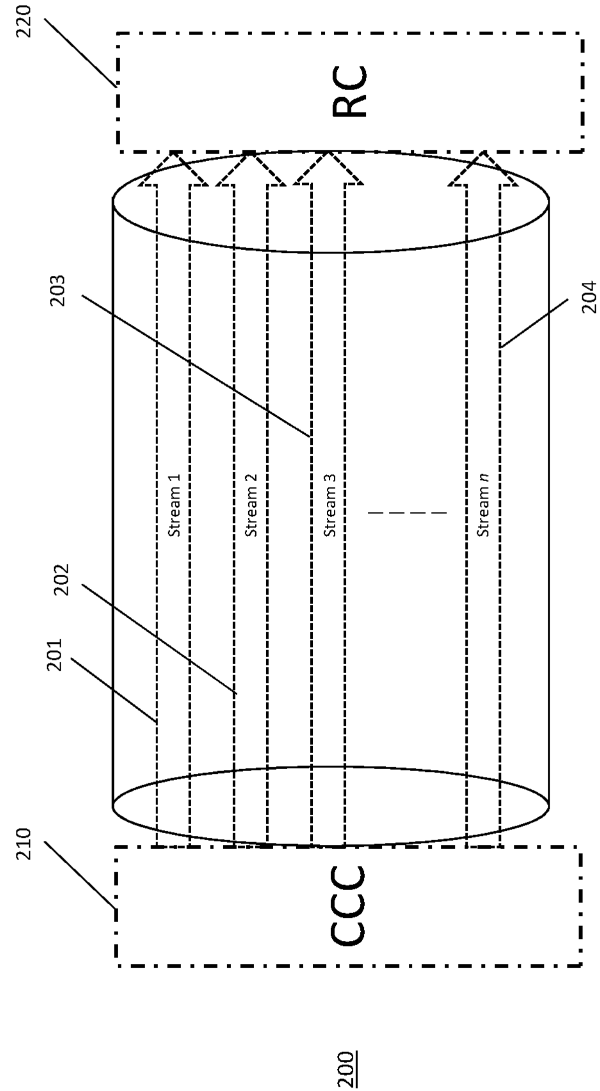
FIG. 2 illustrates a communication link according to example embodiments.

An example communication link, such as 108-1 . . . 108-*n* (of FIG. 1), may be described with reference to FIG. 2. Communication link 200 may comprise a plurality of data channels 201, 202, 203 and 204 (associated with one frequency for example). A physical broadcast channel can consist of one or more audio-video (A/V) streams, audio-only streams and data streams as well as additional signaling information. Each of these channels can carry a data stream such as data Stream 1, Stream 2, Stream 3, . . . , Stream n. The data stream can be A/V, video, audio and/or data only (i.e. no video or audio).

In this context, the phrase "data only" may refer to a stream where the tuner does not search for and play video or audio components of the stream but makes the data on the stream available to other processes on the set-top box for consumption. As such, the bandwidth requirements for a data only channel can be less than those for A/V, video, audio, etc. Each of these channels can also be referred to as subchannels (may also be known as digital subchannels as they are included/implemented in a digital broadcast system). A stream may correspond to a linear list of programs (a "lineup" or "channel") for example. Separate streams, therefore, may contain separate programs.

Communication link 200 may correlate to a 6 MHz broadcast channel for example. The link may provide the medium for communicating a data stream (or streams) representing the information broadcast on the frequency in a STLTP format. The number of subchannels and streams can vary based on transmission parameters such as modulation and code rate that facilitate adjusting of the signal characteristics such as range, strength and the like. Only four such subchannels and streams are illustrated as an example.

In one implementation example, the broadcast channel bandwidth of 6 MHz may correspond to approximately 40 Mbps for a specific combination of transmission parameters. If a 4K stream is encoded at 20 Mbps (per stream) for example, two such streams can be included (for 40 Mbps). If a 720p stream is encoded at 2 Mbps (per stream) in another example, twenty such streams can be included. A combination of streams with varying rates can also be included. Using a combination of these for example, one 4K (at 20 Mbps) stream and ten 720p (2 Mbps each) streams can be included.

A plurality of encoded data streams (corresponding to one physical channel for example) can be transmitted over link 200. Each stream (A/V, audio-only, or data) can be assigned to a separate subchannel. Stream 1 can be transmitted over subchannel 201, stream 2 on subchannel 202, etc. The streams can be transmitted or "sent" by CCC 210 and received by RC 220.

The plurality of subchannels can be modulated and multiplexed by RC. Content corresponding to a plurality of channels (each having a plurality of subchannels) can be communicated between CCC 210 and RC 220 for example.

The receiving RC can then transmit the received streams via an associated broadcast antenna to the market area corresponding to the RC. The signals broadcast from the RC to a user (e.g. RC 112 to viewers 116-1, 116-2 and 116-3 of FIG. 1) may also be in a form similar to that of communication link 200—that is, the signals my be arranged as a plurality of data streams for each subchannel of a plurality of channels.

As highlighted above, the data signals can be decoded and processed for presentation to a viewer by a user communication device such as STB 119-1 for example.

The encoded data streams received by the RCs may be broadcast to viewers (or viewer premises) within the associated market area (MA) as described above. A RC can receive signals from CCC that can include, for example, television programming for a plurality of channels operating on one or more associated frequencies. Each of the frequencies can include a plurality of subchannels in a digital broadcast system.

Under ATSC 3.0, television signals may be broadcast utilizing the internet protocol (IP). The format used is the same format used for communicating data over a broadband and/or internet connection.

According to example embodiments, a first ("primary") media asset, content or data that can include at least one or more of audio, video and text components may be synchronized by the CCC with an associated second ("secondary" or "alternate) media asset, content or data. The secondary or alternate media asset, content or data can include at least one or more of audio, video and text components. The assets (primary and secondary) can include a plurality of (linear) segments that are identified either by consecutive segment numbers or by a timestamp assigned to each segment for example. Each segment can be packetized data having a time duration of 2 seconds for example.

The primary media asset may be transmitted to a RC for OTA broadcast while the secondary media asset can be concurrently communicated over a network such as the internet to one or more CDNs for availability to viewers in the broadcast area. The terms "primary" and "secondary" are used in an arbitrary manner in the sense that in some embodiments, the primary path may be OTA and the secondary path may be OTT while in other embodiments, the primary path may be OTT and the secondary path may be OTA.

The primary media asset may be an audio/video data such as a football game for example. The video component of the primary media asset may be the football game being played on the field. The audio component of the primary media asset may be in English. An audio component of the secondary media asset may be an associated alternate audio in another language such as Spanish. A video component of the secondary media asset may be an associated video from a separate video source or camera angle such as a sideline camera angle, one focused on the scoreboard, on a particular player, etc.

In another example scenario, the primary media asset may include a video component, an audio component and a text component representing closed captions. The audio and closed caption components can be in the same language (e.g. English) or in different languages (e.g. audio in English and closed caption in Spanish). The secondary media asset may include an audio component in another language (e.g. French) and a text component representing closed caption can be in yet another language (e.g. Mandarin). The secondary media asset can be viewer specific based on viewer profiles, preferences, requests, and/or subscriptions.

Figure 3:
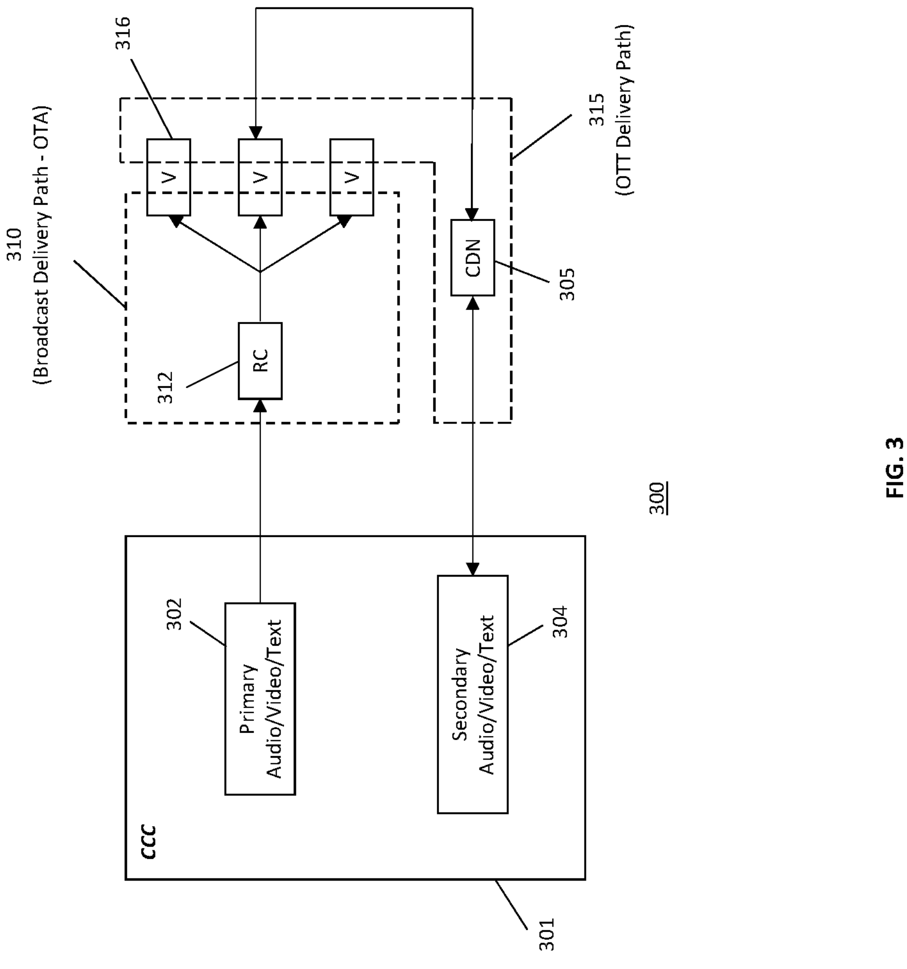
FIG. 3 illustrates a system for communicating media assets according to example embodiments.

As illustrated in FIG. 3, CCC 301 may include (or have stored therein) both primary media asset 302 and secondary or alternate media asset 304. Primary asset 302 may be communicated to RC 312 for broadcast ("pushed") to viewers 316 within the market area of RC 312. This (one way) path is designated as a broadcast delivery path-OTA 310.

Secondary media asset 304 may be communicated (by the CCC) to one or more CDNs 305 (via a two-way communication path). The media asset and/or one or more components thereof may be retrieved ("pulled") by a STB corresponding to a viewer 316 from a CDN 305 that is geographically closest to the viewer (also via a two-way communication path). The path corresponding to the communication of the secondary or alternate data is designated as an OTT (over the top) delivery path 315.

The secondary media asset may be made available to one or more viewers based on viewer profiles, preferences, requests and/or subscriptions. Multiple secondary or alternate media asset components can be provided to the CDN. While both primary and secondary/alternate assets may be synchronized at the CCC, a particular viewer may not have access to both primary and secondary assets in a synchronized manner. In some cases, the broadcast (primary) media asset may be received before the OTT (secondary/alternate) media asset is available at the CDN. In other cases, the secondary/alternate media asset may be available at a CDN before the primary media asset is received via the broadcast path.

The receiving/processing viewer device (e.g. STB which can also be a computing device) may rely on the media asset received via a first path to determine if a corresponding (i.e. synchronized) media asset has been received or is available. The first path can either be OTA or OTT. The STB may invoke a buffer to address potential lack of synchronicity between data received over the separate paths.

In some embodiments, the STB may separate the received (primary) audio/video signal (via the broadcast path for example) into a video component and an audio component. If the viewer preferences indicate the audio presentation in a different language, the alternate (secondary) audio received or made available from the CDN over the network may substitute for the audio received over the primary path. In such a scenario, the alternate audio may be played in conjunction with the corresponding (i.e. synchronized) video received over the primary path.

A substitute or secondary media component need not replace a corresponding primary media component in some embodiments. That is, a secondary media component can supplement the primary media asset or portions thereof. An alternate camera angle can be rendered or displayed as a picture in picture (in addition to and concurrently with the primary video) for example. An alternate audio can be played on another output device connected to the STB. An alternate language closed caption text can be displayed on another output device connected to the STB.

In some embodiments, a secondary media component in the form of a voiceover can be provided. If the viewer is visually challenged or visually compromised (partially or temporarily for example), a voiceover can describe the scene or the position or action of a subject in the scene that is currently being displayed. The voiceover can announce, for example, "John is looking out the window and squinting as he speaks to Mary". The voiceover can be in addition to the audio of the content being output for example.

Figure 4:
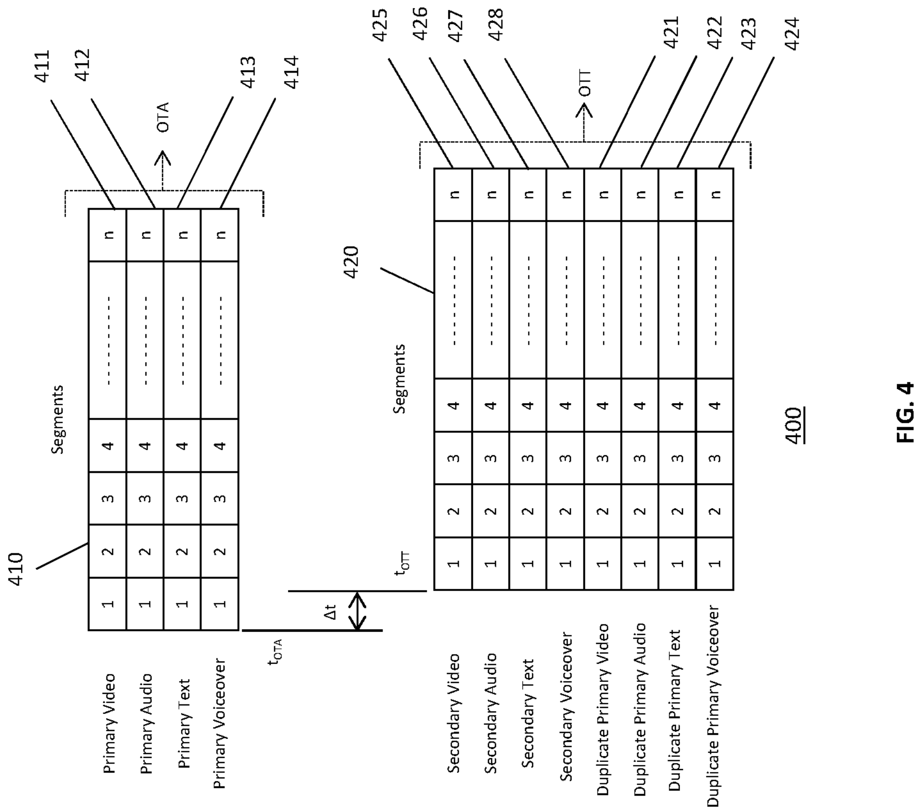
FIG. 4 illustrates media assets received at a user device according to example embodiments.

The media components received by a STB may be illustrated with reference to FIG. 4. Primary media asset 410 (OTA path 310 of FIG. 3) may include, but not limited to, primary video component 411, primary audio component 412, primary text component 413 and primary voiceover component 414.

Secondary media asset 420 (OTT path 315 of FIG. 3) may include, but not limited to, duplicate (of the) primary video 421, duplicate (of the) primary audio component 422, duplicate (of the) primary text component 423 and duplicate (of the) primary voiceover component 424. Secondary media asset 420 may also include secondary video 425, secondary audio 426, secondary text 427 and secondary voiceover 428.

As described above, media assets over the separate paths may not be received or be available to a STB at the same time. In an example scenario, as illustrated in FIG. 4, the OTA media asset 410 may be received (at time $t_{OTA}$) prior to the corresponding OTT media asset being available (at time $t_{OTT}$) at a CDN. The difference in time Δt may be determined by computing the difference between $t_{OTA}$ and $t_{OTT}$ (i.e. $t_{OTT}-t_{OTA}$). The time difference may be used as the (minimum) buffer value. The buffer value cam also be pre-set based on monitoring reception of the OTA and OTT signals. The buffer value, while being optimized, cannot be so high as to degrade user experience. Buffer size may also vary between viewers as some viewers may receive OTA before OTT while others may receive OTT before OTA. The buffer size can also be dynamic in being adjustable based on continuous or periodic monitoring of reception (of OTA and OTT signals). While not specifically illustrated in FIG. 4, in another example scenario, the OTT media asset may be available to a STB at a CDN prior to the OTA media asset being received by the STB.

Figure 5:
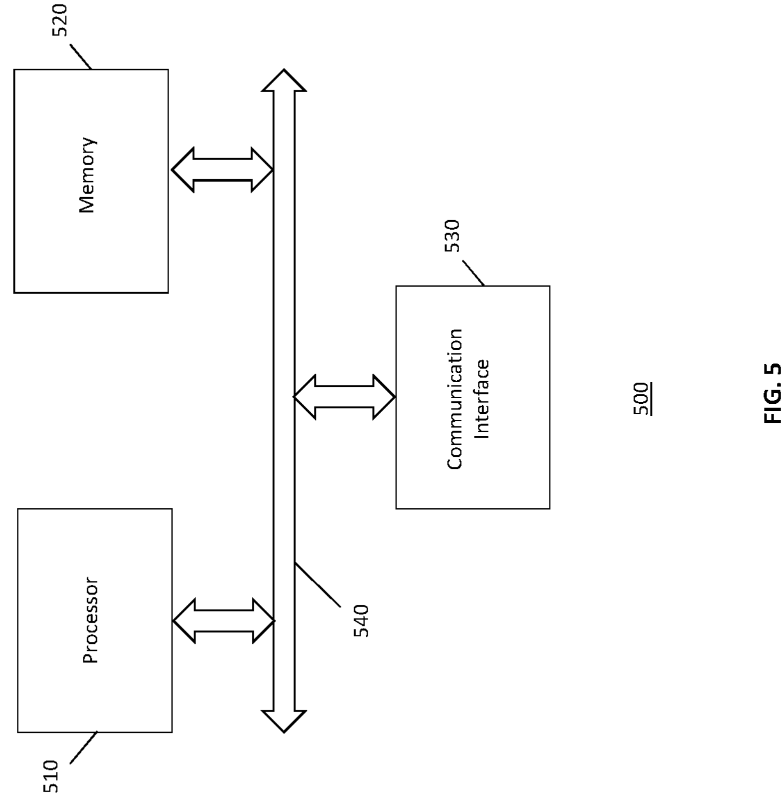
FIG. 5 illustrates a controller according to example embodiments.

A central content controller (CCC) in accordance with example embodiments is illustrated in FIG. 5. CCC 500 may include, but is not limited to, a processor 310, a memory 520, a communication interface 530 and a system bus 340 for interconnecting these components in a known manner. CCC 500 can be a general-purpose computing device. A processor or memory can also refer to a plurality of processors or memory devices. Adjustable Processor 510 may incorporate the functionality of content encoder 104 of FIG. 1 for example. It may encode content and assign data streams to subchannels for example. Processor 510 may also prepare the primary data 302 and secondary data 304 of FIG. 3.

Interface 530 may provide communication between CCC 300 (or CCC 101 of FIG. 1) and the plurality of RCs 112, 122, 132 and 142 in their respective MAs 110, 120, 130 and 140 via paths 108-1, 108-2, 108-3 and 108-4 for example. The paths may be dedicated private network(s) for example.

Interface 530 may also facilitate communication between the CCC 101 and STBs 119-1, 119-2, 119-3, 129, 139 and 149 (of FIG. 1) (thru CDN 305 of FIG. 3) via the Internet 150 (and links 115-1, 115-2, 115-, 125, 135, 145 and 155 for example).

CCC 500 may have AV content stored within memory 520. Memory 520 may also store any other information necessary for facilitating the functionality of the CCC. This may include, but is not limited to, content received from multiple sources, information received from the STBs (such as viewer profiles, preferences, requests and/or subscriptions, etc.), alerts received, list of market areas, routing information to communicate with RCs and instructions for encoding and assigning data streams to subchannels for example.

A RC can also comprise a processor, a memory, a communication interface and a bus interconnecting these components as described with reference to a CCC. Utilizing these components, the RC can receive content from CCC and broadcast the content over the air (OTA).

Figure 6:
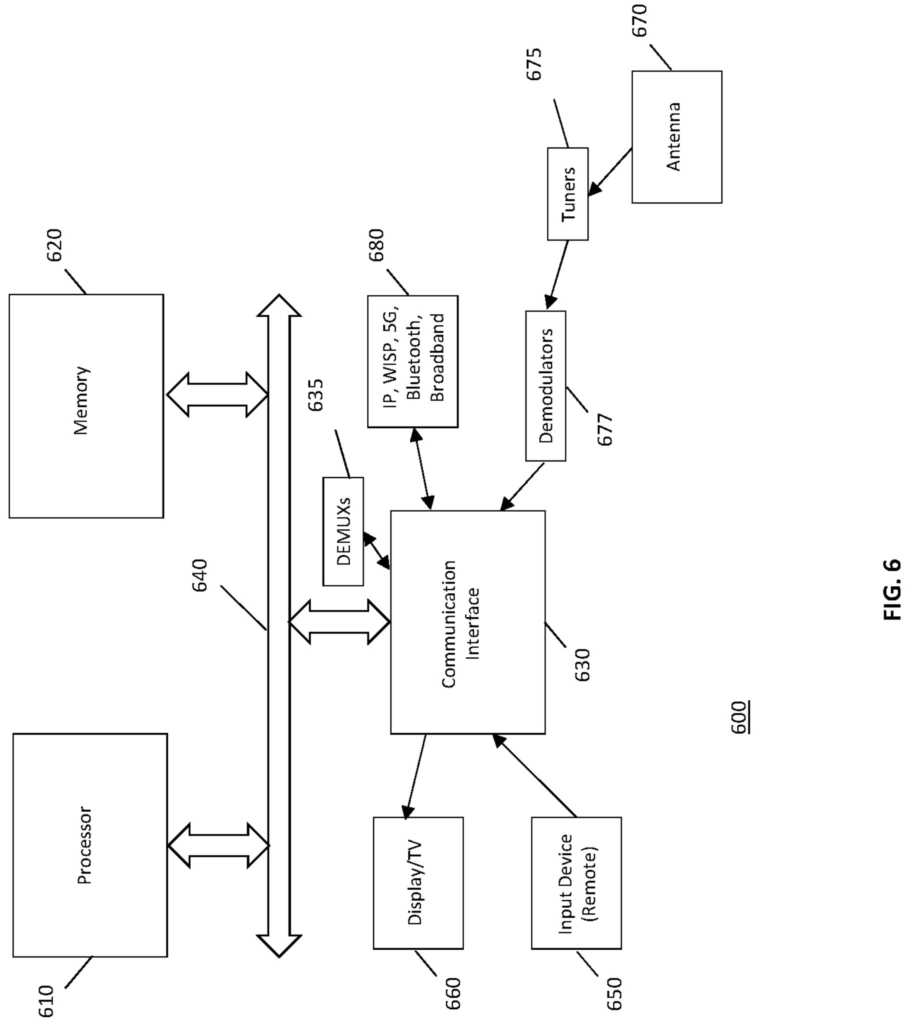
FIG. 6 illustrates a user device according to example embodiments.

An example communication device associated with a viewer such as a set-top-box (STB) in accordance with example embodiments is illustrated in FIG. 6. STB 600 (labeled as 119-1, 119-2, 119-3, 129, 139 and 149 in FIG. 1) may include, but is not limited to, a processor 610, a memory 620, a communication interface 630 and a system bus 640 for interconnecting these components in a known manner. The STB may also be referred to as a user communication device.

Communication interface 630 may receive viewer inputs via a remote control or a keyboard or other such input device 650. Interface 630 may receive data streams on the sub-channels via an antenna 670 (if signal is broadcast/broadcast multicast for example) or over an ISP gateway/modem 680. STB 600 may also comprise at least one or more tuner(s) 675 for tuning into the various broadcast frequencies. STB 600 may also comprise a demultiplexers (DEMUXs) 635 for demultiplexing the received streams.

Interface 630 may also provide communication with a display or monitor (e.g. TV) 660 for displaying AV content. The display may have audio output for playing the audio component of an AV file. Interface 630 may also communicate data with CCC 101 of FIG. 1 (over network 150 and links 115-1, 115-2, 115-, 125, 135, 145 and 155 for example). The data may include viewer input indicating viewer preferences such as content selection for the type programming that can be communicated to the viewer for example. Memory 620 may store the received streams (i.e. recording) for viewing at a time chosen by the viewer.

Processor 610 may process the signals received via antenna 670 for presentation on display 460 as well as process various inputs from a user/viewer input device 650.

The STB could be any reception device. It need not be limited to a typical hardware device as highlighted above. It can be any device (or software) that comprises, but not be limited to, tuners, processor, storage, internet connection and broadcast reception. It can be a mobile phone, a tablet, a laptop, a desktop or the like. It can be an application (or an "app") running on any of these devices. A component (or software module) may be a single device or be constituted as multiple devices (such as network-attached storage, etc.).

Figure 7:
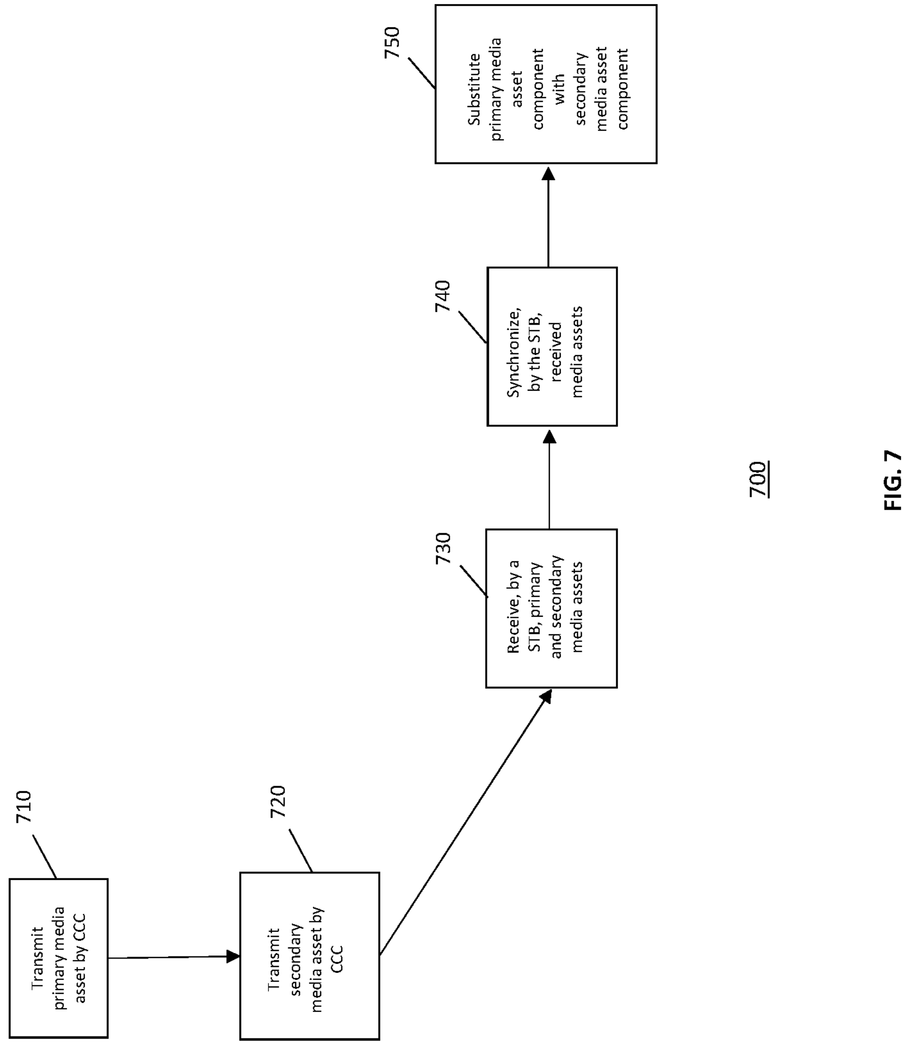
FIG. 7 illustrates a method according to example embodiments.

A method in accordance with an example embodiment may be described with reference to FIG. 7. A CCC may transmit a primary media asset at step 710. The primary media asset can include one or more of an audio component, a video component and a text component. The CCC may transmit a secondary media asset at step 720. The secondary media asset can also include one or more of an audio component, a video component and a text component.

The media assets may be received by a viewer device at step 730. The viewer device can be a set top box (such as STB 600 of FIG. 6) for example. The viewer device can synchronize the primary media asset with the secondary media asset at step 740. Synchronization, in this context, may include associating primary media components with secondary media components based on time stamps or segment numbers of the media components.

Features and functionality associated with example methods and systems as described above may be implemented via software instructions executing on one or more processors of one or more general purpose computing devices or computing systems for example.

While the disclosure highlights AV content, example embodiments are not restricted to processing and presenting such content. Any type of data can be processed and presented utilizing aspects of the example embodiments described herein.

Although example embodiments have been disclosed, it will be apparent to those skilled in the art that various changes and modifications can be made which will achieve some of the advantages of embodiments without departing from the spirit and scope of the disclosure. Such modifications are intended to be covered by the appended claims.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments and what is described in the Abstract below, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of communicating a media asset, the method comprising:

transmitting, by a central content controller (CCC), a primary media asset to a regional controller (RC) associated with a respective market area (MA) for broadcasting over the air (OTA) to a plurality of viewers located within the MA, wherein the primary media asset includes at least one of an audio component, a video component and a text component;

transmitting, by the CCC, a secondary media asset corresponding to the primary media asset to a content delivery network (CDN) for access by a viewer device corresponding to at least one of the viewers within the MA, wherein the secondary media asset includes at least one of an audio component, a video component and a text component;

receiving, by a viewer device, the primary media asset via an OTA path and the secondary media asset via a CDN path;

synchronizing, by the viewer device, the primary media asset received via the OTA path and the secondary media asset received via the CDN path; and presenting, concurrently, at least one component of the primary media asset and at least one component of the secondary media asset in addition to the at least one component of the primary media asset to a viewer associated with the viewer device, wherein the transmission of the primary media asset via the OTA path is concurrent with the transmission of the secondary media asset via the CDN path, wherein when a component of the primary media asset received via the OTA path or a component of the secondary media asset received via the CDN path is unavailable, a corresponding received component is buffered until receipt of the unavailable component, the buffering being based on a time difference between receipt of the primary media asset via the OTA path and receipt of the secondary media asset via the CDN path.

2. The method of claim 1, further comprising:

receiving the broadcast primary media asset via an antenna associated with the viewer device.

3. The method of claim 1, further comprising:

substituting the at least one component of the primary media asset with the at least one component of the secondary media asset.

4. The method of claim 3, further comprising:

supplementing the primary media asset with the at least one component of the secondary media asset.

5. The method of claim 4, wherein:

the at least one component of the secondary media asset used for the supplementing is a video signal.

6. The method of claim 1, further comprising:

when the component of the secondary media asset received via the CDN path is unavailable, buffering the component of the primary media asset received via the OTA path until receipt of the component of the secondary media asset via the CDN path.

7. The method of claim 1, further comprising:

when the component of the primary media asset received via the OTA path is unavailable, buffering the component of the secondary media asset received via the CDN path until receipt of the component of the primary media asset via the OTA path.

8. The method of claim 7, further comprising:

assigning a buffer value based on determining the time difference between receipt of the primary media asset received via the OTA path and receipt of the secondary media asset via the CDN path.

9. A computing device comprising:

a processor;

a memory;

a communication interface; and a system bus for interconnecting the processor, the memory and communication interface, wherein the communication interface is configured to:

receive media assets from a central content controller (CCC) concurrently over an over the air (OTA) interface and a network connection; and communicate data to the CCC, and the processor is configured to:

synchronize a primary media asset received via a first path over the OTA interface with a corresponding secondary media asset received via a second path over the network connection; and present, concurrently, the synchronized primary media asset and secondary media asset, wherein when a component of the primary media asset received via the first path over the OTA interface or a component of the secondary media asset received via the second path over the network connection is unavailable, a corresponding received component is buffered until receipt of the unavailable component, the buffering being based on a time difference between receipt of the primary media asset and receipt of the secondary media asset.

10. The device of claim 9, wherein the network connection provides a two way communication link to the CCC via a content delivery network (CDN).

11. The device of claim 9, further comprising:

an antenna for receiving a signal corresponding to the primary media asset; and at least one tuner for tuning into a frequency corresponding to the frequency at which the media asset is being broadcast OTA.

12. The device of claim 9, wherein the processor is further configured to provide a buffer for the buffering.

13. The device of claim 9, wherein the presenting of the synchronized primary media asset and secondary media asset comprises:

substituting a component of the primary media asset received via the first path over the OTA interface with a component of the secondary media asset received via the secondary path over the network connection.

14. A non-transitory computer readable medium containing program instructions for communicating a media asset, wherein execution of the program instructions by one or more processors of one or more computer systems causes the one or more processors to carry out the steps of:

transmit, by a central content controller (CCC), a primary media asset to a regional controller (RC) associated with a respective market area (MA) for broadcasting over the air (OTA) to a plurality of viewers located within the MA, wherein the primary media asset includes at least one of an audio component, a video component and a text component;

transmit, by the CCC, a secondary media asset corresponding to the primary media asset to a content delivery network (CDN) for access by a viewer device corresponding to at least one of the viewers within the MA, wherein the secondary media asset includes at least one of an audio component, a video component and a text component;

receive, by a viewer device, the primary media asset via an OTA path and the secondary media asset via a CDN path;

synchronize, by the viewer device, the primary media asset received via the OTA path and the secondary media asset received via the CDN path; and present, concurrently, at least one component of the primary media asset and at least one component of the secondary media asset in addition to the at least one component of the primary media asset to a viewer associated with the viewer device, wherein the transmission of the primary media asset via the OTA path is concurrent with the transmission of the secondary media asset via the CDN path, wherein when a component of the primary media asset received via the OTA path or a component of the secondary media asset received via the CDN path is unavailable, a corresponding received component is buffered until receipt of the unavailable component, the buffering being based on a time difference between receipt of the primary media asset via the OTA path and receipt of the secondary media asset via the CDN path.

* * * * *